United States Patent [19]

Sugiyama et al.

[11] Patent Number: 4,589,290
[45] Date of Patent: May 20, 1986

[54] TORQUE SENSOR

[75] Inventors: Jun Sugiyama; Yutaka Nonomura; Kouji Tsukada; Keiichi Shimaoka; Masaharu Takeuchi; Takashi Takeuchi, all of Aichi, Japan

[73] Assignee: Kabushiki Kaisha Toyota Chuo Kenkyusho, Aichi, Japan

[21] Appl. No.: 684,390

[22] Filed: Dec. 20, 1984

[30] Foreign Application Priority Data

Dec. 28, 1983 [JP] Japan .............................. 58-248887

[51] Int. Cl.$^4$ ............................................... G01L 3/10
[52] U.S. Cl. ............................ 73/862.36; 73/DIG. 2; 324/206
[58] Field of Search ......... 73/862.36, 862.33, DIG. 2; 324/209

[56] References Cited

U.S. PATENT DOCUMENTS

| | | | |
|---|---|---|---|
| 4,135,391 | 1/1979 | Dahle | 73/862.36 |
| 4,479,390 | 10/1984 | Meixner | 73/862.36 |
| 4,506,554 | 3/1985 | Blomkvist et al. | 73/862.36 |

Primary Examiner—Donald O. Woodiel
Attorney, Agent, or Firm—Koda and Androlia

[57] ABSTRACT

A torque sensor for detecting variation in the drive torque of an automobile comprises an excitation coil wound on an excitation core and a detection coil wound on a detection core. The coils and cores are inserted into a chamber formed within a bearing for supporting a drive shaft and having an opening along the sliding surface of the bearing. The poles of the excitation core and the poles of the detection core are respectively disposed at prescribed clearances from the surface of the drive shaft in such manner that the poles of the detection core intersect the excitation core between its poles, whereby variation in drive torque is detected as magnetostriction.

13 Claims, 6 Drawing Figures

F I G. 2
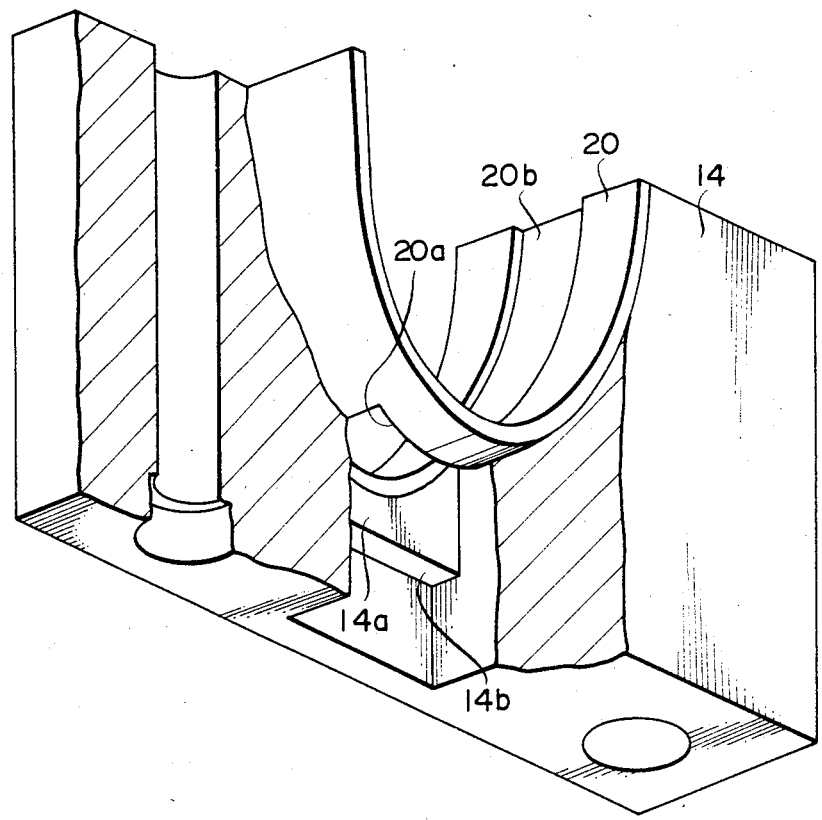

TORQUE SENSOR

BACKGROUND OF THE INVENTION

1. Field of the Invention

This invention relates to a torque sensor, more particularly to an improved torque sensor capable of noncontactingly detecting drive torque variation as magnetostriction.

2. Description of the Prior Art

In various kinds of rotating drive mechanisms there is a need to measure torque simply and accurately since such measurement is exceedingly useful in a diverse range of industrial fields for analyzing drive mechanisms and for obtaining a better understanding of their operating condition.

Rotary drive mechanisms are used as prime movers in virtually every sector of industry, two of the most common types being automobile engines and industrial motors. In analyzing the operating condition of such mechanisms it is as important to be able to accurately determine torque as it is to determine the number of revolutions. Measurement of torque is particularly important in the case of automobile engines since by measuring the torque at the engine and at the transmission, propeller shaft, differential gear and other points of the power train it is possible to control the ignition timing, the amount of fuel injection, the timing for transmission shift, the gear ratio, etc. As a result of such control, it is possible to improve fuel efficiency, driving characteristics, etc.

Also in the case of industrial motors accurate torque measurement can provide data for optimizing control and diagnosis of rotary drive systems.

Generally, for torque measurement, it is preferable to use a noncontacting sensor so as not to exert an adverse effect on the rotating shaft concerned. Such a sensor it is desirable to be small, light in weight, easy to attach and detach, and easy to maintain.

In the past, a number of different types of torque sensors have been proposed with the aim of satisfying these requirements. These will be explained in the following.

One type is the strain gage sensor which uses a number of strain gages bonded in a bridge arrangement on the surface of the rotating shaft. This system is disadvantageous in that it is troublesome to bond the gages, that it is necessary to provide a telemeter or a slip ring for electrical connection to the strain gages and that it is almost impossible to maintain the sensor mounted on the drive mechanism at all times. As a result the strain gage sensor is normally used only for special instrumentation purposes.

Another type is the twist-angle sensor which uses magnetic elements or light-reflection elements mounted at at least two places on the rotating shaft and measures the torque from the difference in rotational phase between different points on the shaft. Like the strain gage sensor, this type is also large in size and cannot easily be built internally into the drive system.

A third type is the magnetostriction sensor which uses a combination of an excitation coil provided near the rotating shaft and a detection coil and measures variation in torque as magnetostrictive change. Being small and enabling noncontacting measurement, this type of torque sensor can advantageously be built internally into the drive system and promises to meet the various requirements that have not been satisfied by the other types referred to above.

The fact is, however, that conventional magnetostriction sensors generally employ excitation and detection coils that are directly or indirectly wound about the rotating shaft making them large in size and limiting the mounting position. Although it has been proposed to make the excitation and detection coils smaller and mount them around a shaft bearing, this arrangement reduces the amount of magnetic flux passing through the rotating shaft, making it impossible to realize adequate measurement accuracy.

SUMMARY OF THE INVENTION

The object of this invention is to provide a high-precision torque sensor of the magnetostriction type which can readily be attached to and detached from the drive mechanism and which is small in size and light in weight.

The above object of the present invention is accomplished by providing a torque sensor comprising an excitation coil wound on an excitation core and a detection coil wound on a detection core. These coils and cores are inserted into a chamber formed within a bearing for supporting a drive shaft, which bearing has an opening along its sliding surface, the poles of the excitation core being disposed at a prescribed clearance from the surface of the drive shaft and the poles of the detection core being disposed at a prescribed clearance from the surface of the drive shaft, in such manner as to intersect the excitation core between the poles thereof, whereby high-precision torque measurement is made possible with a small and simple structure as a result of the close proximity of the poles to the drive shaft.

BRIEF DESCRIPTION OF THE DRAWINGS

FIG. 2 is a fragmentary perspective view showing a chamber provided in the crankshaft bearing of FIG. 1 for housing a torque sensor according to a first embodiment of this invention.

DETAILED DESCRIPTION OF THE INVENTION

Embodiments of the invention will now be described with reference to the drawings.

Figure 1:
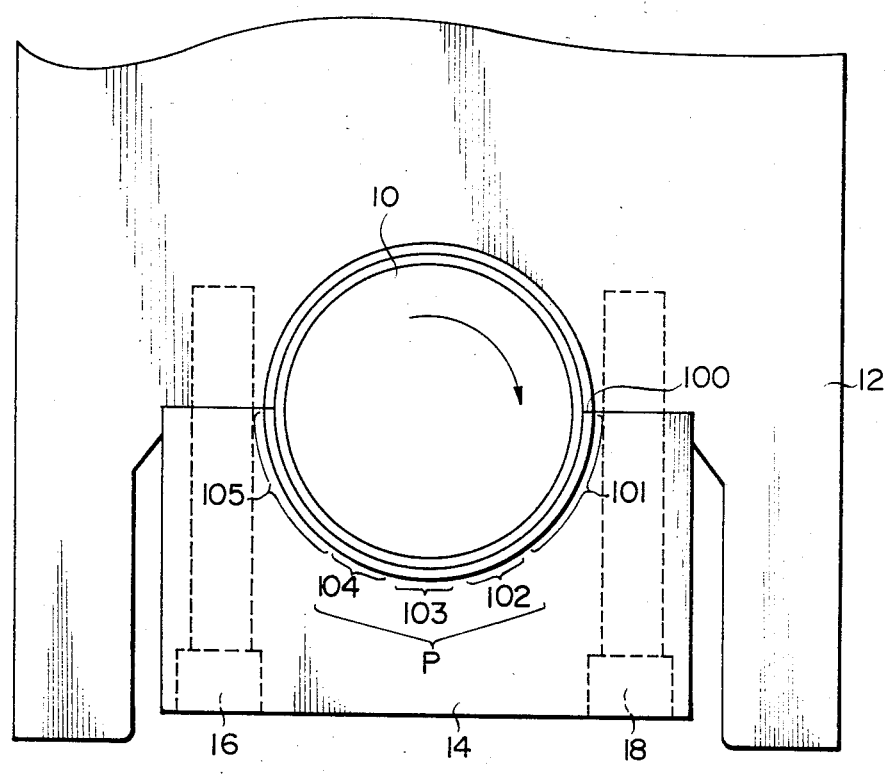
FIG. 1 is an explanatory view showing a crankshaft bearing of an automobile engine to which the torque sensor of the present invention can be applied.

Embodiment 1:

FIG. 1 schematically shows the structure of a crankshaft bearing of an automobile engine to which the torque sensor of this invention is applied. As is well known, an automobile engine crankshaft is supported between the engine block 12 and a bearing cap 14. Since the crankshaft 10 transmits the torque generated by the respective cylinders to the flywheel, the overall torque output by the multicylinder engine can be easily measured by detecting the torque at the bearing which exists between the final cylinder and the flywheel.

FIG. 1 shows the final bearing in a multicylinder engine. In the present invention, the torque sensor is built into the bearing cap 14 of the journal bearing which supports the drive shaft, namely the crankshaft 10. As shown in the figure, the bearing cap 14 is detachably fixed to the engine block 12 by a pair of bolts 16, 18, so that when the torque sensor of this invention is built into the bearing cap 14 it is exceedingly easy to mount and dismount.

Figure 3:
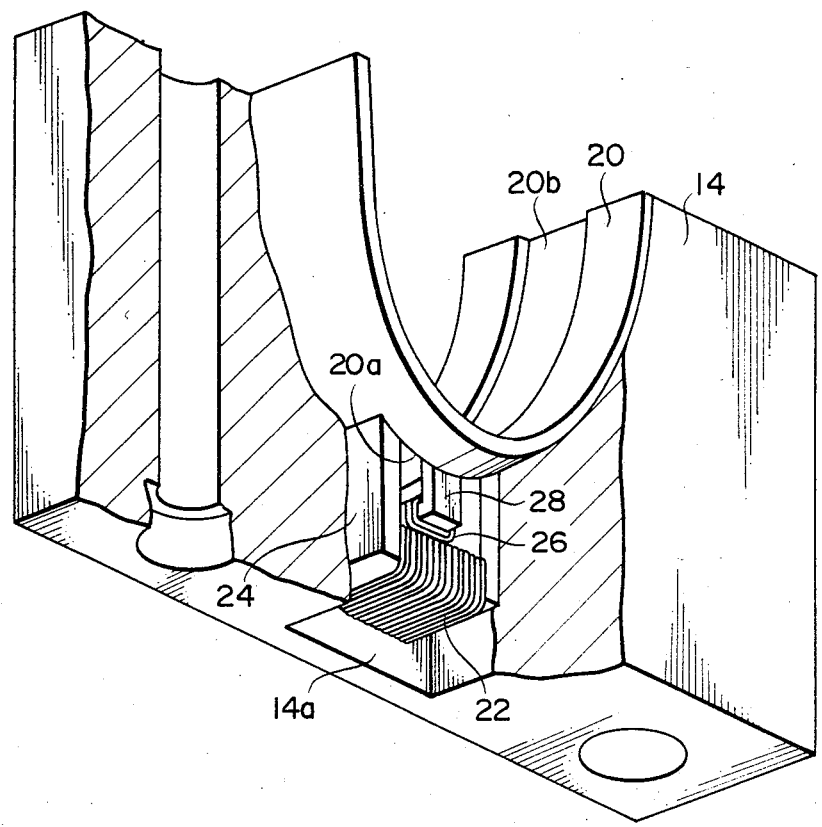
FIG. 3 is a fragmentary perspective view showing the state in which the torque sensor according to the first embodiment is mounted on the bearing of FIG. 2.

FIG. 2 shows an example of the opening (chamber) provided in the bearing cap 14 for insertion of the torque sensor device of this embodiment and FIG. 3 shows how the torque sensor device of the present embodiment is mounted in the bearing cap 14. As will be noted from these figures, the half bearing consists of the bearing cap 14 and a journal bearing metal 20. In order to enhance the sensitivity of a magnetostriction type torque sensor such as that of the present invention it is preferable for both the bearing cap 14 and the journal bearing metal 20 to be made of nonmagnetic materials. In this particular embodiment, the bearing cap 14 is made from a nonmagnetic material, Japanese Industrial Standard (JIS) SUS 304, while the journal bearing metal 20 is made from a ferromagnetic material, SPCC, to which an Al alloy has been pressure welded.

What characterizes the present embodiment is that, as can be seen from the figures, the journal bearing metal 20 is cut away at the sliding surface of the bearing to form an opening 20a and the bearing cap 14 is similarly provided with an opening 14a that communicates with the opening 20a. The openings 20a, 14a together form a chamber into which an excitation coil and core and a detection coil and core (to be described later) are inserted.

The opening 20a in the journal bearing metal 20 is a long rectangular slot extending in the direction of rotation of the drive shaft, namely the crankshaft 10. Another feature of this embodiment is that a groove 20b of the same width as the opening 20a is formed on the inner surface of the journal bearing metal 20 over the full length thereof. As a result of the provision of this groove 20b, it is possible to prevent a breakdown in the oil film or other such problem which might otherwise be caused by the cut-away portion in the sliding surface constituted by the opening 20a. Although the provision of the groove 20b naturally reduces the area of the bearing sliding surface of the journal bearing metal 20, no particular problem arises in actual practice regarding the ability of the metal to act as a bearing for the crankshaft 10. Moreover, as in the case of a conventional bearing whose bearing surface has been reduced by the provision of a groove, any problem that might arise can be overcome by increasing the width of the journal bearing metal.

The opening 14a in the bearing cap 14 is a rectangular chamber extending in the circumferential direction of the crankshaft 10 in alignment with the opening 20a in the journal bearing metal 20. The opening 14a is provided on its inside surface with a shoulder 14b which serves as a positioning member for a torque sensor (described later) to be housed within the opening 14a. Although the strength of the bearing cap 14 is reduced to some degree by the provision of the opening 14a, this can easily be compensated for by giving the bearing cap increased height.

As shown in detail in FIG. 3, an excitation core 24 having an excitation coil 22 wound thereon is inserted into and fixed in the openings 14a, 20a. Further, in this embodiment, a detection core 28 having a detection coil 26 wound thereon is disposed on the inner side of the excitation core 24 so as to lie perpendicular to the excitation core 24.

In this embodiment, the excitation core 24 is a U-shaped body formed by laminating fourteen 0.35 mm thick silicon-steel sheets. The poles of the excitation core extend through the opening 20a of the journal bearing metal 20 to face the outer surface of the crankshaft 10. Thus when a predetermined alternating current is applied through the excitation coil 22 a predetermined alternating magnetic flux is applied through the crankshaft 10. In order to prevent contact between the outer surface of the crankshaft 10 and the excitation core 24, the poles of the excitation core 24 are of course disposed to maintain a predetermined clearance between themselves and the outer surface of the crankshaft. The excitation coil 22 is formed of 100 turns of 0.3 mm copper wire coated with polyimide.

The detection core 28 is a U-shaped body formed by laminating thirteen 0.2 mm sheets of 45% Ni-55% Fe alloy and is disposed inwardly of and perpendicular to the excitation core 24. Similarly to the excitation core 24, its poles are disposed to maintain a predetermined clearance with respect to the outer surface of the crankshaft 10. The detection coil 26 is formed of 300 turns of 0.06 mm copper wire coated with polyimide.

Figure 4:
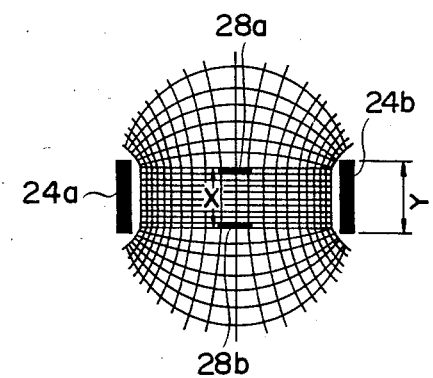
FIG. 4 is an explanatory view showing the magnetic field configuration in one embodiment of the torque sensor according to the present invention.

FIG. 4 shows the magnetic field configuration on the surface of the crankshaft 10 and also shows the positioning of the excitation core 24 and the detection core 28. As can be seen from this drawing, the poles 24a, 24b of the excitation core 24 are rectangular in cross section. As a result, it is possible to obtain a uniform and dense magnetic field between the two poles, as shown in FIG. 4. The poles 28a, 28b are also rectangular in cross section. In this embodiment, it is preferable for the poles 28a, 28b to be disposed within the uniform magnetic field produced between the poles 24a, 24b of the excitation core 24 and, in fact, they are disposed such that the width X of the gap between them is approximately equal to the width Y of the excitation core 24. Experiments further show that it becomes possible to carry out signal detection within an extremely dense and uniform magnetic field by making the width X of the gap between the poles of the detection core 28 smaller than the width Y of the excitation core, thereby to improve signal detection efficiency.

More specifically, in accordance with the magnetostriction system employed in the present invention, the alternating current supplied to the excitation coil 22 causes the alternating magnetic field configuration shown in FIG. 4 to be produced within the crankshaft 10. Then when internal stress arises in the crankshaft 10 as a result of torque therein, the field configuration is varied accordingly. The change in field configuration is sensed by the detection core 28 located within the region of change and is detected as an electrical signal from the detection coil 26. It is thus possible to carry out very high-precision torque detection in a noncontacting manner.

In the case where the torque sensor according to this invention is installed in the bearing of an automobile engine as in this embodiment, it is necessary to carefully determine the proper position for the sensor, that is the proper position for the openings in the bearing, in order to assure that installation of the torque sensor does not have an adverse effect on the performance of the bearing. In this connection, it is preferable to provide the openings at the optimal positions which will assure prevention of seizure of the bearing as the result of a breakdown of the lubricating oil film. Since in an automobile engine the straight-line reciprocating motion of the pistons within the cylinders is converted into rotary motion by the crankshaft, the load on a bearing supporting the crankshaft varies from point to point on the bearing surface. Therefore, if the position for providing the openings required in this invention is properly determined with due consideration to the fact that the bearing load is determined by the distribution of cylinder pressure and further that the thickness of the lubricating oil film also varies from point to point, it is possible to provide the openings without in any way impairing the performance of the bearing.

Figure 5:
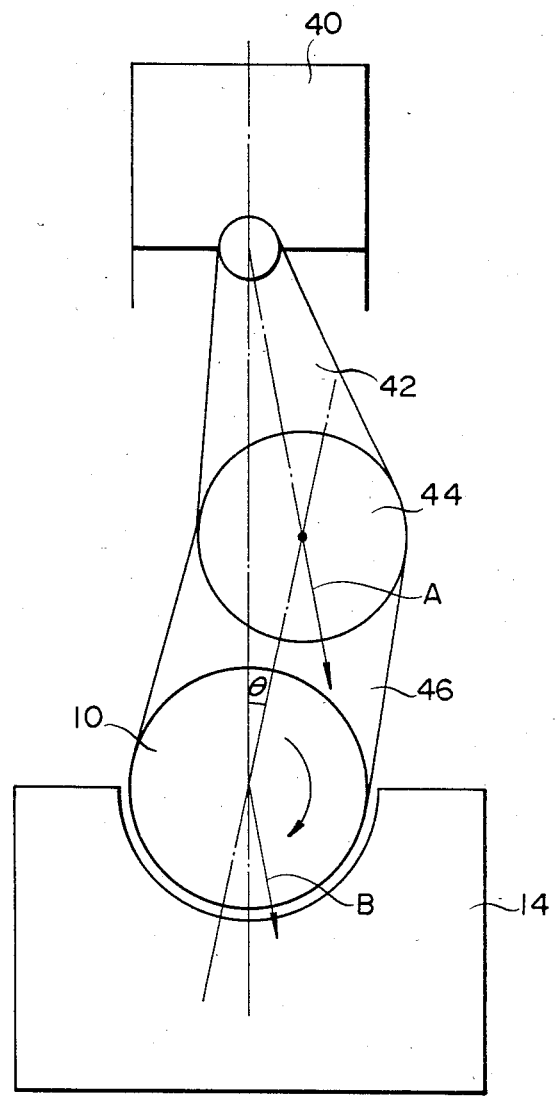
FIG. 5 is an explanatory view showing the power stroke load on the bearing when the present invention is applied to the crankshaft bearing of an automobile engine.

FIG. 5 shows the relationship among the cylinder, piston and crankshaft of an engine as seen from the front end of the engine. It is well known that the cylinder pressure peaks at a point between 0 and 10 degrees beyond top dead center and FIG. 5 shows the positions of the piston 40 and the crankshaft 10 at this time. The force exerted on the piston 40 is transmitted to a crankshaft pin 44 via a connecting rod 42 as indicated by the arrow A. This force is transmitted from the pin 44 through an arm 46 to the crankshaft 10. The force exerted on the crankshaft 10 acts on the bearing cap 14 in the direction of the arrow B, which lies parallel to the aforesaid arrow A.

From this it will be understood that the maximum load is exerted on the bearing cap 14 in the direction of the arrow B so that in selecting the position for provision of the insertion openings for the sensor it is best to avoid the position of maximum load indicated by the arrow B. If care is taken to avoid this position, it is possible to adequately maintain the strength of the bearing and at the same time to reduce the load on the sensor itself.

On the other hand, as regards the distribution of the oil film, the lubricating oil enters into the gap between the journal bearing metal and the crankshaft 10 from the joint 100 between the bearing halves and thus the desired oil film is formed. The thickness of the oil film is greatest in the region 101 immediately following the joint 100 and becomes progressively thinner in the regions 102, 103, 104, 105. Consequently, provision of the sensor openings in the terminal regions (104, 105) of the lubrication zone where the oil film is very thin will clearly increase the danger of inducing a breakdown of the oil film and consequent seizure of the bearing. Also, as can be seen from FIG. 1, the regions 101 and 105 respectively coincide with the regions of the bolts 18 and 16. Thus taking the matter of oil film thickness and the position of the bolts into consideration, the sector available for provision of the sensor openings is limited to the portion P comprised of the regions 102, 103 and 104.

Therefore, taking into consideration both the load at the time of the combustion stroke analyzed above with reference to FIG. 5 and the conditions regarding oil film thickness and bolt position mentioned in connection with FIG. 1, it will be understood that in applying the invention to the crankshaft of an automobile engine the optimum position for the sensor is the region 103 directly below the crankshaft in the bearing cap 14. Thus, by providing the openings 14a, 20a directly under the crankshaft as shown in FIGS. 2 and 3, it is possible to provide the required opening in the sliding surface of the bearing while at the same time assuring entirely adequate bearing characteristics; that is while maintaining sufficient bearing strength and good bearing performance free from the risk of a breakdown in the lubricating oil film. As a result, it is feasible to build the torque sensor according to the present invention into a bearing that has substantially the same structure as a conventional bearing. As shown in the illustrated automobile engine torque sensor, the load on the sliding surface of an automobile engine crankshaft bearing varies from point to point. It has become possible to achieve compatibility between good bearing performance and the narrow clearance between the sensor and the crankshaft by providing the opening for the sensor at a region that is subject to relatively low load.

Moreover, as was described in the foregoing, in the present embodiment the journal bearing metal 20 is provided with the groove 20b in alignment with the opening 20a. As a consequence, the cavitation-erosion that normally occurs when there is a cut-away portion in the sliding surface of a bearing because of the rapid change in oil pressure at the boundary surface of the cut-away portion can be positively eliminated, thus assuring excellent bearing performance free from any risk of overheating or seizure of the bearing.

In this embodiment, the cores 24, 28 are held in the openings 14a, 20a by retaining cases which should preferably be made of ceramic; in this particular embodiment they are made of machinable glass-ceramic. Further, by inserting a spacer of suitable thickness between these retaining cases and the shoulder 14b provided in the opening 14a, it is possible to carry out fine adjustment of the clearance between the cores 24, 28 and the crankshaft.

In actual practice it is preferable to fix the retaining cases and the cores 24, 28 within the opening 14a at the final stage so as to assure that the torque sensor is firmly fixed within the bearing cap 14. However, where it is desired to make the torque sensor detachable from the bearing cap 14, it is also possible to fix the retaining cases within the opening 14a with bolts. In this case, as the bearing cap is freely detachable from the engine block 12, there is the advantage that the torque sensor can be very easily dismantled for cleaning or repair.

In the embodiment described above, the excitation coil is disposed along the circumference of the crankshaft and the detection coil is disposed to lie perpendicular to the excitation coil. It is, however, possible to reverse the positional arrangement of the two coils.

Embodiment 2:

In this embodiment, the torque sensor is provided in an automobile crankshaft bearing of identical structure to that described in conjunction with the first embodiment but is provided in the side of the bearing cap which faces the flywheel.

Figure 6:
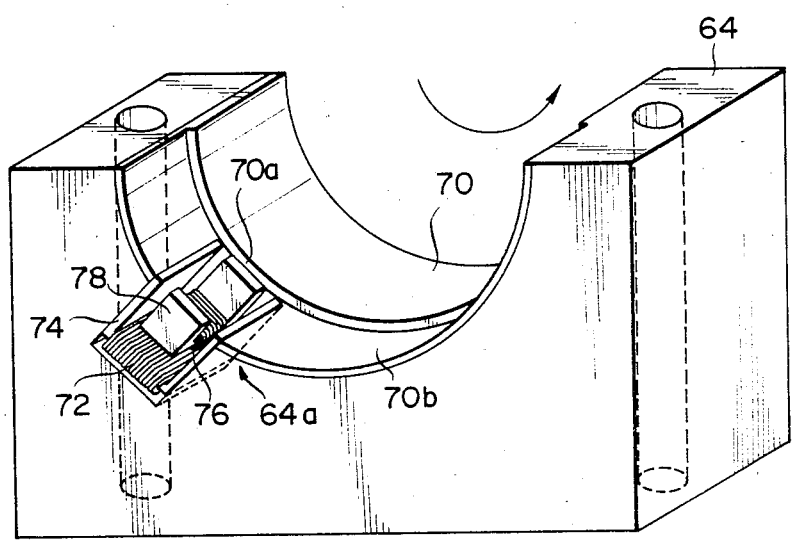
FIG. 6 is an explanatory view showing the state in which the torque sensor according to a second embodiment of the invention is mounted.

FIG. 6 shows the torque sensor according to this embodiment as built into the side of a bearing cap 64 which faces the flywheel. As will be noted from the figure, the bearing consists of the bearing cap 64 and a journal bearing metal 20.

In this second embodiment, the bearing cap 64 is provided on the side thereof facing the flywheel at a position corresponding to the region 101 in FIG. 1 with a chamber 64a of rectangular cross section extending lengthwise along the circumference of the bearing cap 64. The journal bearing metal 70 is provided with a corresponding opening 70a that communicates with the chamber 64a. The excitation core and coil and the detection core and coil constituting the torque sensor are mounted in the chamber 64a and opening 70a.

The journal bearing metal 70 is further provided over the entire length of the inner surface thereof with a groove 70b of the same width as the opening 70b. As a result of the provision of this groove 70b, the opening 70a and the groove 70b form a continuous cut-away portion extending over the full length of the journal bearing metal 70, whereby it is possible to prevent cavitation and erosion that might otherwise arise because of a sudden drop in lubricating oil pressure in the vicinity of the opening 70b.

The reason for providing the chamber 64a and the opening 70a on the side of the bearing cap 64 at a position corresponding to the region 101 in FIG. 1 will now be explained.

When the crankshaft rotates, the regions on the lower side of the bearing which are subject to relatively low pressure are those of the bearing cap denoted by reference numerals 101 and 105 in FIG. 1. On the other hand, the more preferable of these two regions for the provision of the chamber 64a and the opening 70a in view of the distribution of the oil film is, for the reason explained in connection with the first embodiment, the region 101.

In the case of the first embodiment, since the opening was provided midway of the width of the journal bearing metal 20, it was not possible to provide it in the region 101 because the bolt 18 for attaching the bearing cap 14 would interfere with the mounting of the torque sensor at this position.

In the present embodiment, however, thanks to the provision of the opening 70a and the chamber 64a on the side face of the bearing cap 64, it is possible to mount the torque sensor at the region 101. Moreover, it should be noted that the side of the bearing cap selected for mounting of the sensor is not the engine side, where it would be exposed to the influence of combustion within the engine and heat, but the flywheel side where it is relatively protected from these influences.

As in this second embodiment the chamber 64a and the opening 70b for accommodating the excitation coil and core and the detection coil and core which constitute the torque sensor are provided on the side of the bearing cap 64 facing the flywheel in the region 101 thereof, this embodiment has the following advantages over the first embodiment:

1. As the chamber 64a and the opening 70a are provided in the region 101 where the pressure load at the time of crankshaft rotation is minimum, the load on the torque sensor can be minimized and both the bearing effect and the clearance between the sensor and the drive shaft can be adjusted with greater ease.

2. In providing a groove in the journal bearing metal, since for a given groove width better bearing performance in terms of the oil film on the journal bearing metal is obtained when the groove is provided on the side of the journal bearing metal than when it is provided at the center of the width thereof, the arrangement according to the second embodiment is superior in that breakdown of the oil film and bearing seizure are less likely to occur.

3. Since the torque is detected at the rear side of the final bearing, the torque sensor is not affected by torque loss due to bearing friction and can therefore detect the effective output torque with higher accuracy.

4. The arrangement according to this second embodiment makes it easier to carry out the machining for providing the opening in the journal bearing metal and the chamber in the bearing cap, facilitates the mounting and dismounting of the sensor (the excitation coil and core and the detection coil and core) in the bearing cap, and greatly eases the work involved in inspection and maintenance of the torque sensor.

As has been explained in the foregoing, in accordance with the present invention a magnetostrictive-type torque sensor is built into a bearing supporting a drive shaft with the poles of the excitation coil and detection coil brought into very close proximity with the outer surface of the drive shaft through an opening formed in the sliding surface of the bearing. As a result, the sensor is able to provide high-resolution detection in spite of its small size and is ideal for applications requiring high-precision torque analysis. Moreover, as the torque sensor according to the present invention employs the magnetostrictive effect, it is able to measure the torque regardless of the direction or rate of rotation of the drive shaft and also to measure static torque, giving it an extremely wide range of applications.

Further, as the torque sensor is built into the bearing it is safe from invasion of dust and corrosive substances so that it has a long service life.

We claim:

1. A torque sensor comprising an excitation coil wound on an excitation core and a detection coil wound on a detection core, said coils and cores being inserted into a chamber formed within a bearing for supporting a drive shaft, said chamber having an opening along a sliding surface of said bearing, and the poles of said excitation core being disposed at a prescribed clearance from the surface of the drive shaft and the poles of said detection core being disposed at a prescribed clearance from the surface of the drive shaft in such manner as to intersect said excitation core between the poles thereof at a prescribed angle, thereby detecting variations of drive torque as magnetostriction.

2. A torque sensor according to claim 1, wherein the poles of said excitation core are disposed along the circumference of the drive shaft.

3. A torque sensor according to claim 1, wherein the poles of said excitation core are disposed along the axis of the drive shaft.

4. A torque sensor according to claim 1, wherein said detection core is disposed inwardly of said excitation core and the interval between the poles of said detection core is located within a uniform magnetic field produced by said excitation core.

5. A torque sensor according to claim 4, wherein said interval between the poles of said detection core is equal to or smaller than the width of said excitation core.

6. A torque sensor according to claim 4, wherein the poles of said detection core are disposed perpendicularly to the poles of said excitation core.

7. A torque sensor according to claim 1, wherein the sliding surface of said bearing is provided with a groove formed along the inner circumference of the bearing in alignment with said opening.

8. A torque sensor according to claim 1, wherein said excitation core and said detection core are each enclosed in a retaining case and the retaining cases are fixed at prescribed positions within said chamber.

9. A torque sensor according to claim 1, wherein said bearing is a crankshaft bearing of an automobile engine comprising a bearing cap and a bearing metal, and said chamber is formed in said bearing cap and the opening of said chamber is formed along a sliding surface of said bearing metal.

10. A torque sensor according to claim 9, wherein the opening of said chamber is formed at a center portion in the width direction of the sliding surface of said bearing metal and directly below the crankshaft.

11. A torque sensor according to claim 10, wherein the sliding surface of said bearing metal is provided with a groove formed along the inner circumference of said bearing metal, said groove having the width equal to or larger than the width of the opening of said chamber.

12. A torque sensor according to claim 9, wherein the opening of said chamber is formed at a side portion in the width direction of the sliding surface of said bearing metal, said side portion being on the side of a flywheel, and at a position close to a lubricating oil introducing portion.

13. A torque sensor according to claim 12, wherein the sliding surface of said bearing metal is provided with a groove formed along the inner circumference of said bearing metal, said groove having a width equal to or larger than the width of the opening of said chamber.

* * * * *